Figure 1:
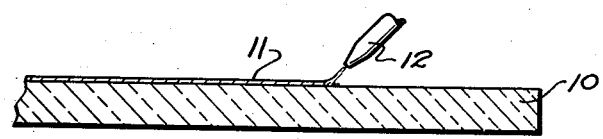

July 21, 1931.  F. FRASER  1,815,884
LAMINATED GLASS
Filed Nov. 19, 1928

Inventor
Frank Fraser

Patented July 21, 1931

1,815,884

UNITED STATES PATENT OFFICE

FRANK FRASER, OF TOLEDO, OHIO, ASSIGNOR TO LIBBEY-OWENS-FORD GLASS COMPANY, OF TOLEDO, OHIO, A CORPORATION OF OHIO

LAMINATED GLASS

Application filed November 19, 1928. Serial No. 320,305.

The present invention relates to laminated glass and to the process of producing the same. Laminated or composite glass is commonly called in the art "non-shatterable" or "non-scatterable" glass. Such glass is ordinarily produced by uniting two or more sheets or plates of glass and one or more non-brittle membranes. The value of such a composite sheet of glass is dependent to a considerable degree upon the quality and permanency of the bond between the several laminations. It is essential the bond be such that one or more of the glass sheets can be broken or shattered without separating from the non-brittle portion.

The bond between the laminations, to be satisfactory from a commercial standpoint, must be such that it will not be affected adversely by climatic conditions encountered in actual use.

It has been found that laminated glass produced in accordance with some processes, subsequent to its manufacture, frequently develops a separation of the glass from the non-brittle substance. This condition is commonly referred to as "let-goes". These "let-goes" may occur around the marginal portions of the sheet and work inwardly thereof or may occur in any part of the composite sheet. The "let-goes" result from a breaking down of the bond between the laminations so that at the point of the "let-go", there is no further bond or union.

It has also been noticed that an undesirable condition may present itself in the composite sheet due to appearance of bubbles. To unite two sheets of glass and a sheet of non-brittle material in a manner that an apparently excellent bond is obtained between the various laminations offers no grave problem. That is, laminations can be bonded together by the aid of some binding material, the bond between the laminations to all intents and purposes appearing satisfactory upon the completion of the composite sheet, at which time the composite sheet may be devoid of "bubbles", "let-goes", and so forth. The mechanical and physical properties of the composite sheet when completed, however desirable they may be, do not necessarily establish or determine that such sheet will retain its desirable properties when subjected to varying and adverse conditions of use. To determine the value of such bond, it is advisable to ascertain whether or not the product will hold up when subjected to atmospheric conditions in actual use, such as extreme high and low temperatures, seasonal changes, and atmospheric conditions, particularly sunlight. As an example, it has been found that a sheet of laminated glass may withstand exceptionally high temperatures, as encountered in use, without bubbling or developing "let-goes" and yet when subjected to relatively low temperatures, will become relatively brittle and no longer possess the non-shatterable qualities desired. On the other hand, a composite sheet may be produced that will be non-shatterable at low temperatures but when subjected to relatively high temperatures, as encountered in use, will develop "let-goes" and "bubbles" or both. It has been found that the presence of relatively low boiling point, high vapor pressure solvents in the laminated glass, such as for example, acetone, amyl acetate, alcohol, or fusel oil, will render such sheet to a marked degree susceptible to bubbling.

In laminating processes where the non-brittle membrane is a cellulose composition material, a solvent or softening agent for the non-brittle membrane is commonly used. The softening agent is applied to the non-brittle material, after which the sheets of glass and treated material are brought together in proper superimposed relationship and then subjected preferably to the combined action of heat and pressure to form a composite sheet. In following this procedure, great care has to be taken, such as, regulating the time the non-brittle material is acted upon by the solvent or mixture of solvents before pressure is applied to the "sandwich", otherwise the non-brittle membrane will be extruded to a marked degree beyond edges of the glass sheets during the laminating process. The term "sandwich" is used to designate the laminations as a group when arranged in proper superimposed relationship before they have been bonded together to produce the finished composite sheet. This extruding condition sets up internal strains in the finished composite sheet, frequently causing the finished product to develop "after-cracks", i. e., a breakage of one or more of the glass sheets. This condition is more pronounced with solvents or mixture of solvents that penetrate the non-brittle material to a marked degree during the laminating process.

The present invention contemplates the use of a bonding material or medium for the various laminations which will produce a finished product or composite sheet adapted for general use under varying climatic conditions, without developing undesirable defects such as "bubbles", "let-goes", and "after-cracks" as heretofore pointed out. With bonding medium of this character, two or more sheets of glass and one or more membranes formed from a cellulose composition material can be united preferably under the combined action of heat and pressure in a manner that a satisfactory bond will result.

In fashioning a laminated or composite glass sheet in accordance with the present invention, two or more sheets or plates of glass previously cleansed are brought together with an interposed layer of non-brittle membrane, formed from a cellulose composition material. This non-brittle membrane may appear in several ways, for instance,—

(1) The inner surface of each sheet of glass may be sprayed or otherwise coated with a skin or plurality of skins of cellulose composition material.

(2) The inner surfaces of each sheet may remain uncoated and brought together with an interposed sheet of cellulose composition material.

(3) The inner surfaces of each sheet of glass may be sprayed or otherwise coated with a skin of cellulose composition material. A sheet of cellulose composition material is then interposed between the skin coated surfaces of the glass sheets.

Irrespective of the manner in which the cellulose composition material skin may be applied or whether there be undercoatings or underskins of other materials, it will be observed that in any of the cases illustrated at least a single surface of cellulose composition material, whether it be the surface of such a skin or surface of such a sheet, is to form one of the bonded surfaces.

The present invention contemplates the establishment of a bond between the surfaces to be joined by the use of a bond-inducing medium having little, if any, inherent adhesive properties, the use of such an inductor operating to effect a softening of the surface of the cellulose composition material. The adverse condition of bubbling, heretofore referred to, can to a marked extent be minimized, if not wholly eliminated, by the use of a bond-inducing medium having a relatively high boiling point, low vapor pressure. Apart from other causes of bubbling, it has been found that the use of solvents or softeners having high vapor pressures tend to produce the adverse bubbling condition in the completed composite sheet. If a solvent of low boiling point be utilized, ordinarily a too rapid attack upon the cellulose surface will be obtained during the fashioning operation. Such a condition tends to promote an extrusion or flowing of the interposed membrane under the action of the press. This flowing in turn renders liable a cracking of one or more of the glass sheets owing to a relief in pressure applied to the several portions of the sheet. The flowing may also occasion a strained or tensioned condition in the completed composite sheet resulting in "after cracking".

Assuming that it is desired to fashion a composite sheet from two or more sheets or plates of glass and one or more non-brittle membranes, the use of a relatively high boiling point, low vapor pressure solvent as a bond-inducing medium, is employed, the vapor pressure of the solvent being sufficiently low that it will not have a deleterious effect upon the finished sheet when in actual use. The use of esters of phthalic acid, such as for example dibutyl phthalate and diethyl phthalate, is proposed. Esters of phthalic acid as a class have a relatively high boiling point and low vapor pressure.

Although the present invention contemplates the use of esters of phthalic acid broadly, for simplicity of description the use of dibutyl phthalate as the bond-inducing medium will be discussed.

It is preferred that the non-brittle substance used be a cellulose composition material, which expression, of course, includes pyroxylin plastic. Dibutyl phthalate, and of course all esters of phthalic acid, is a good bond-inducing medium for producing laminated glass when a cellulose composition material is used as the non-brittle portion of the composite sheet. The dibutyl phthalate is a very stable liquid and can be obtained commercially in a relatively pure state. It further possesses a relatively high boiling point, low vapor pressure, which, as above pointed out, is an important factor from a practical standpoint.

Figure 2:
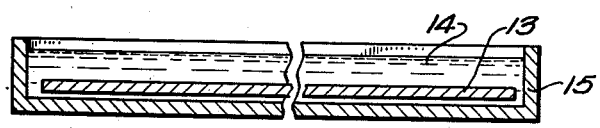
Figure 3:
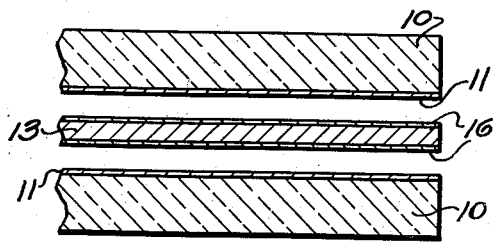
Figure 4:
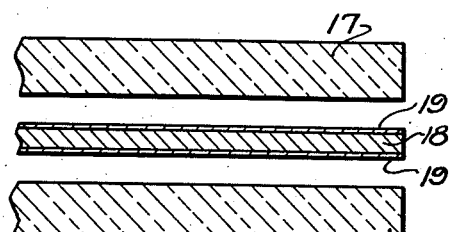
Figure 5:
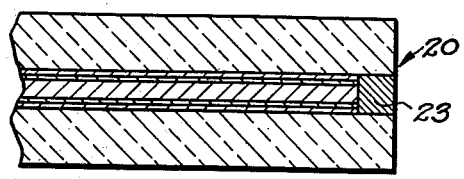
Figure 6:
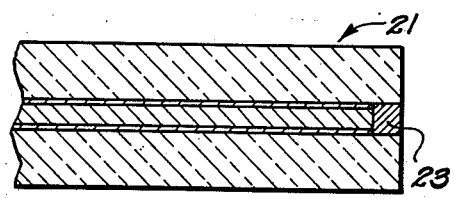
Figure 7:
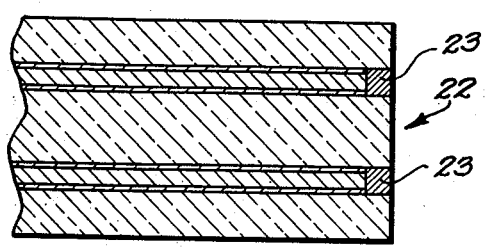

In the drawings wherein like numerals are employed to designate like parts throughout the same, Fig. 1 is a diagrammatic view showing the creation of a skin on a sheet of glass, Fig. 2 shows diagrammatically one way of applying the bond-inducing medium to a non-brittle membrane, Fig. 3 is a fragmentary sectional view showing the laminations before they are united and including skin coats on the glass sheets, Fig. 4 is a similar view without using the skin coats, Fig. 5 is a sectional view of the laminations in Fig. 3 after they have been united, Fig. 6 is a sectional view of the laminations in Fig. 4 after they have been united, and Fig. 7 is a sectional view of a sheet of "bullet-proof" glass.

This application constitutes a continuation in part of my application Serial No. 150,458, filed November 24, 1926.

To fabricate a laminated or composite sheet of glass, one surface of each sheet of glass 10 in Fig. 1 may be provided with a skin coat 11, or not, as desired. A skin coat may be formed on the glass sheets by spraying with the means 12 or otherwise depositing a coating of some suitable material such as a cellulose composition material on the glass sheets in a manner to create a skin. Although a cellulose composition material is preferred as a skin coat, it will be understood that other types of materials can be used either alone as a skin coat or as undercoatings for the cellulose composition material skin.

A sheet of cellulose composition material 13 is then coated with a film of dibutyl phthalate which may be applied by dipping, spraying, or otherwise applying the same. In Fig. 2, a bath of dibutyl phthalate 14 is contained in the receptacle 15, and by dipping the sheet 13 as shown, the sheet will be properly covered on both sides. After the non-brittle sheet has been suitably treated with the dibutyle phthalate, it may be interposed between the skin coated surfaces of the glass sheets as indicated in Fig. 3, and the sandwich thus formed placed in a suitable laminating apparatus. In Fig. 3 it will be noted that the non-brittle membrane 13 carries the films 16 of dibutyl phthalate. The apparatus is preferably then so controlled that the sandwich is subjected to the combined action of heat and pressure whereby to bond the laminations together to form a finshed composite sheet.

Although various periods of time, pressure, and range of temperatures may be used to produce satisfactory laminated or composite glass, it has been found that a good quality marketable glass is produced when the sandwich above referred to is subjected to a pressure of approximately one hundred pounds per square inch for approximately fifteen minutes at a temperature of approximately 220° F.

While the use of skin coats on the glass sheets has been described, satisfactory commercial glass has been produced without such skin coats. That is to say, a dibutyl phthalate treated sheet of non-brittle material can be interposed between previously cleansed surfaces of the glass sheets to produce a sandwich, which sandwich is subjected to the combined action of heat and pressure to produce a composite sheet. Note Fig. 4 wherein the glass sheets 17 are not provided with skin coats. However, the non-brittle membrane 18 carries the films 19 of dibutyl phthalate.

Attention is directed to the fact that in the case where skin coats are not used on the glass sheets, the non-brittle sheet should be subjected to the action of the dibutyl phthalate for a relatively longer period of time preliminary to the pressing operation than when the skin coats are used on the sheets of glass, with or without the non-brittle sheet.

Dibutyl phthalate is of such character that the non-brittle sheet can be subjected to the action thereof for varying periods of time before its interposition between the glass sheets without affecting the uniformity of production to any noticeable extent. In practice, this attribute is of value because it is difficult, if not impossible, to control the exactness of time which elapses from the treating of the non-brittle sheet with the bond-inducing medium and the application of heat and pressure to the sandwich. While the dibutyl phthalate will not adversely affect the non-brittle sheet during various periods of time prior to the pressing operation, it has a sufficient plasticizing action on the non-brittle sheet at the time of application thereto to cause the non-brittle sheet, to be, in effect, molded to the contour of the inner surfaces of the glass sheets or skins thereon as the case may be, and intimately secured thereto upon the application of heat and pressure to the sandwich in the laminating apparatus. This bond or union will be permanent to the extent that the composite sheet thus produced will be non-shatterable and non-scatterable under ordinary conditions.

Although the action of the dibutyl phthalate upon the non-brittle sheet is sufficient to cause a good bond between the laminations, it does not penetrate or soften the sheet to the extent that the non-brittle sheet will flow during the pressing operation. As the non-brittle sheet is molded to the contour of the glass sheets or skins thereon instead of the glass sheets being distorted to conform to the non-brittle sheets, internal strains sufficient to cause "after cracking" are not liable to bet set up in the composite sheet.

The solvent herein contemplated as the bond inducing medium is of that stable character in the laminated sheet when the latter is in normal use that any decomposition of the bond inducing medium or the expected or natural decomposition of the pyroxylin plastic incident to the lapse of time and heat and light energy will not be materially accelerated. The solvent possesses a sufficiently low vapor pressure as to minimize the tendency toward bubbling within the sheet due to a change of state of the bond inducing medium by passing from the liquid to the vapor phase when properly used.

Solvents may be employed within the spirit of the invention as long as they possess the desirable characteristics of stability, high boiling point, and low vapor pressure. Esters of phthalic acid, for example, have been found to satisfactorily embody the above characteristics. It is obvious that certain solvents, having the characteristics above specified, in carrying out the principle of the invention may vary from one another in degrees of high boiling points and low vapor pressures, etc. By way of illustration, in the practice of the invention as herein set forth, the boiling point of the solvent should preferably be above 350° F. and should preferably not exceed one-half the vapor pressure of camphor at ordinary temperatures. Assuming the vapor pressure of camphor to be .4 mm. of mercury at 68° F. or ordinary temperature, the vapor pressure should preferably not exceed .2 mm. of mercury at 68° F.

It has been demonstrated that solvents having the characteristics before mentioned and having a boiling point not lower and a vapor pressure not exceeding that specified have produced satisfactory results.

As shown in Figs. 5, 6 and 7, the finished sheets 20, 21, and 22 respectively, are protected by the "seals" which protect the bond between the laminations from atmosphere, etc. The seals may be made from any suitable water-proofing material such as pitch or the like.

I claim:

1. As a new article of manufacture, a sheet of laminated glass consisting of two or more sheets of glass with an interposed non-brittle material treated with a high boiling point, low vapor pressure solvent which is stable in the laminated sheet, the vapor pressure of said solvent being sufficiently low to substantially minimize a tendency toward bubbling in the laminated sheet when in normal use.

2. As a new article of manufacture, a sheet of laminated glass consisting of two or more sheets of glass with an interposed non-brittle material treated with an ester of phthalic acid.

3. As a new article of manufacture, a sheet of laminated glass consisting of two or more sheets of glass with an interposed non-brittle material treated with dibutyl phthalate.

4. As a new article of manufacture, a sheet of laminated glass consisting of two or more sheets of glass with an interposed non-brittle material and a solvent for inducing a bond between the glass and interposed non-brittle material, said bond inducing solvent having a high boiling point and low vapor pressure and being stable within the sheet, whereby in normal use the bond inducing solvent will not materially accelerate the natural decomposition of the non-brittle material and will not materially increase the normal tendency toward bubbling in the sheet.

5. As a new article of manufacture, a sheet of laminated glass consisting of two or more sheets of glass with an interposed sheet of pyroxylin plastic and a sufficient quantity of solvent for effecting a proper bond between the glass and the pyroxylin plastic, said bond inducing solvent having a high boiling point and low vapor pressure and when in the laminated sheet being stable so that in the normal use of the laminated sheet, the bond inducing solvent will not materially accelerate the natural decomposition of the pyroxylin plastic and will not materially increase the normal tendency toward bubbling in the sheet.

Signed at Toledo, in the county of Lucas and State of Ohio, this 16th day of November, 1928.

FRANK FRASER.